Figure 1:
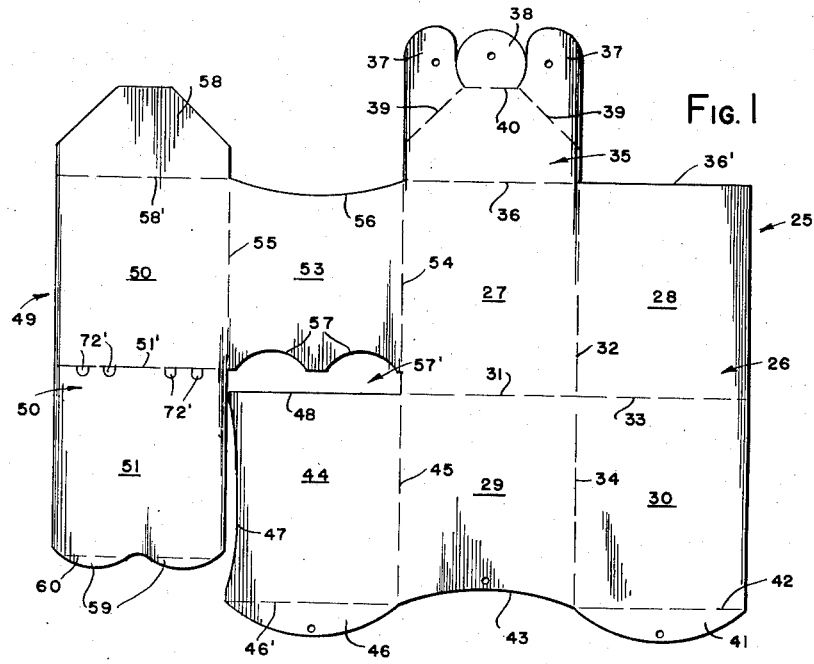

Dec. 9, 1958   H. M. HERBENER   2,863,485
BILL FOLDERS

Filed March 20, 1956   8 Sheets-Sheet 1

INVENTOR
HENRY M. HERBENER

ATTORNEY

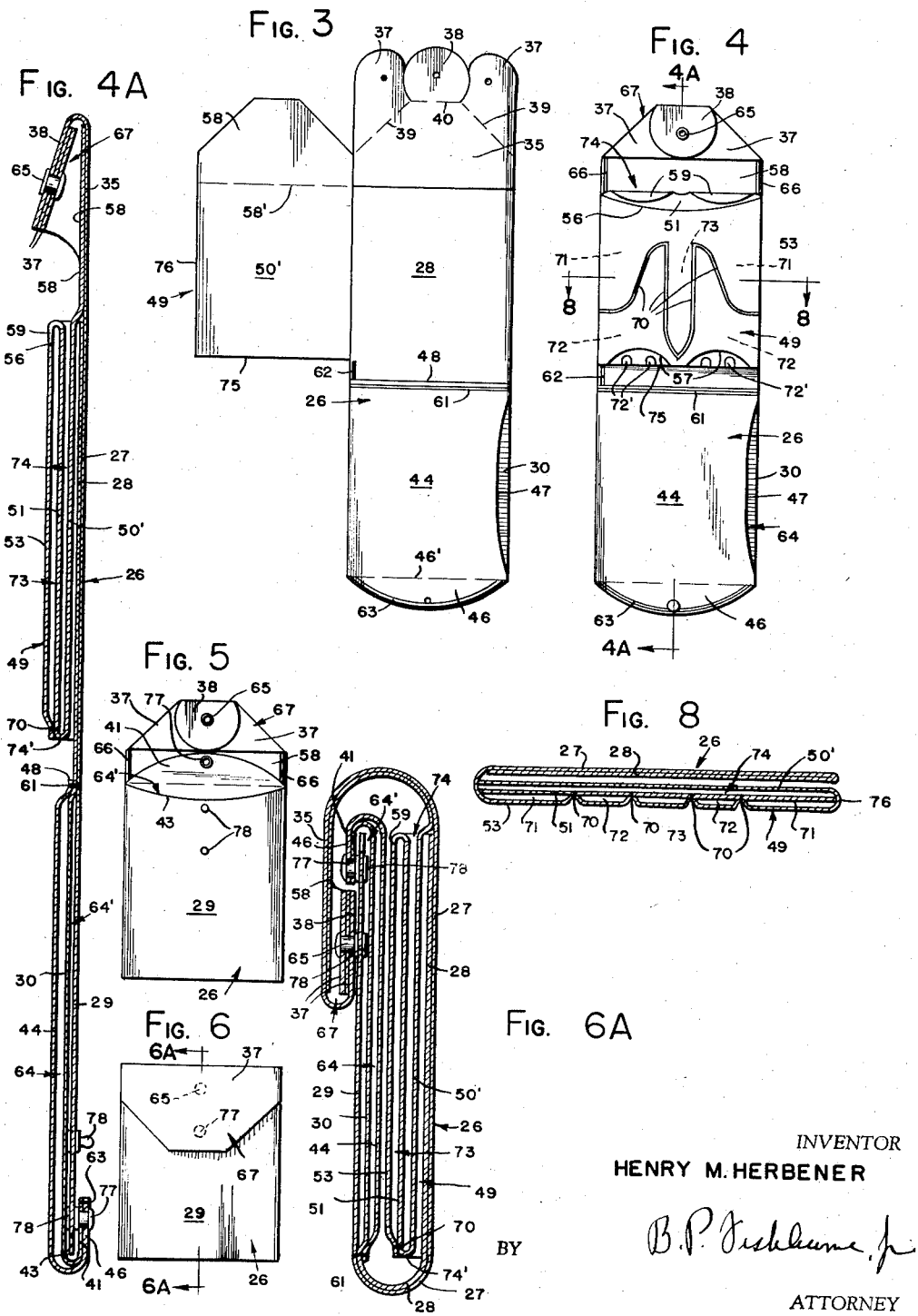

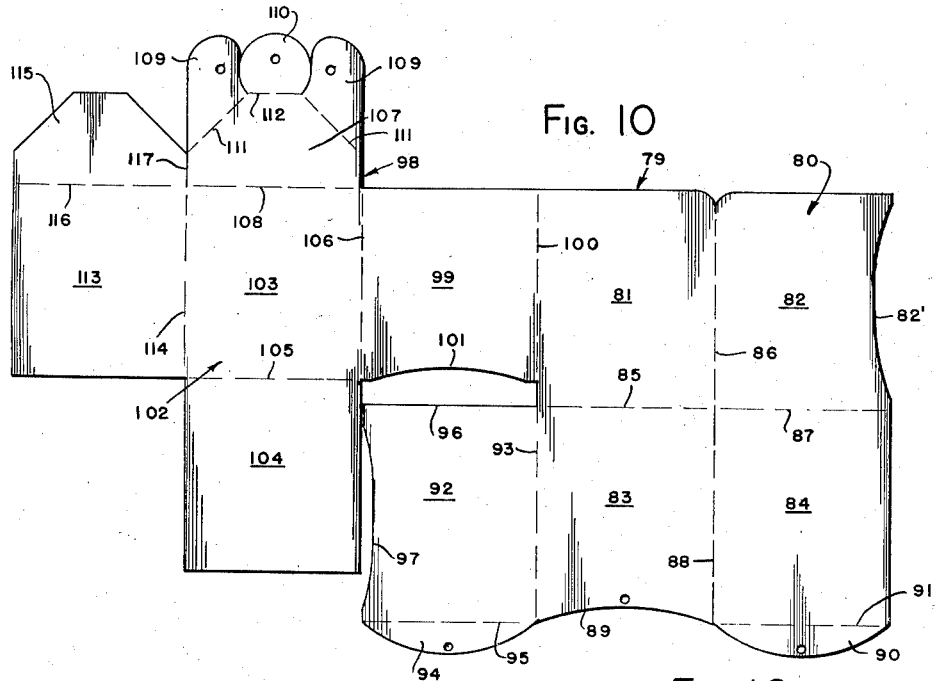

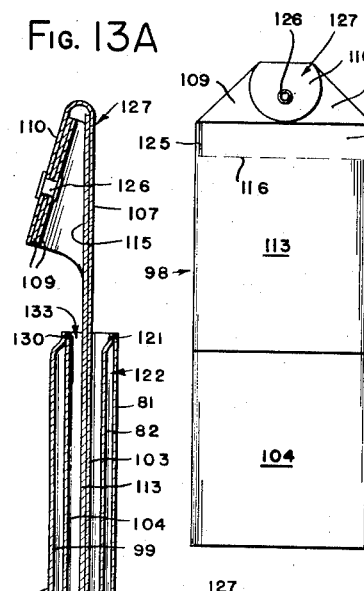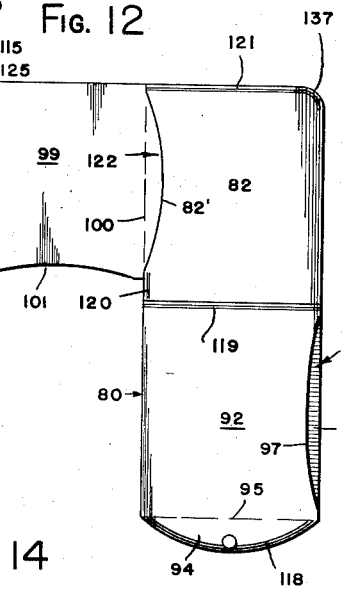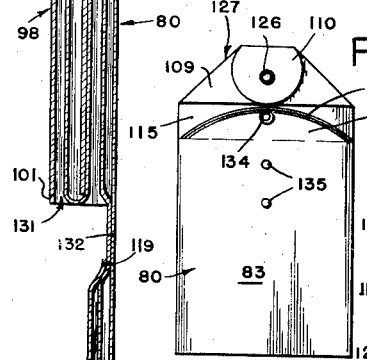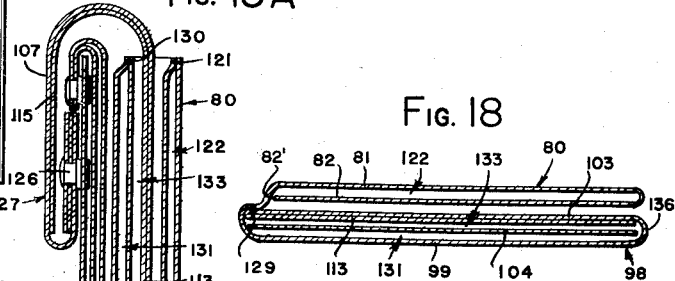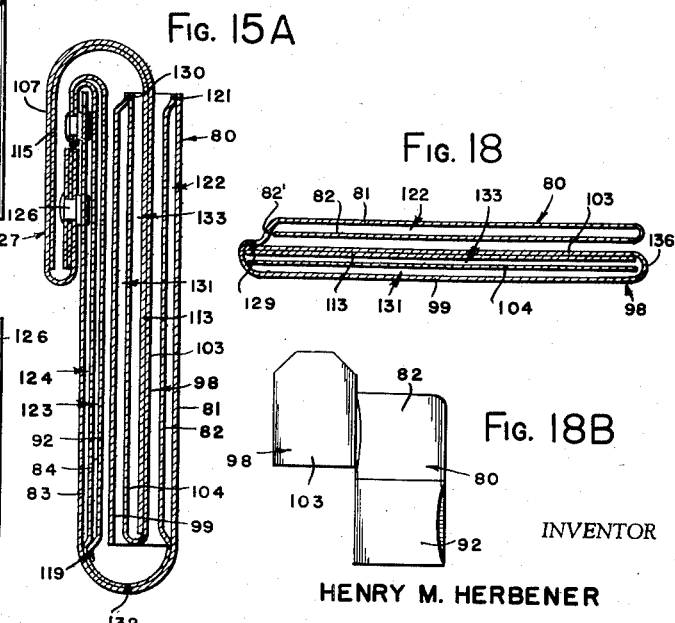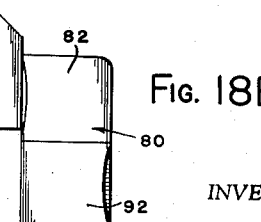

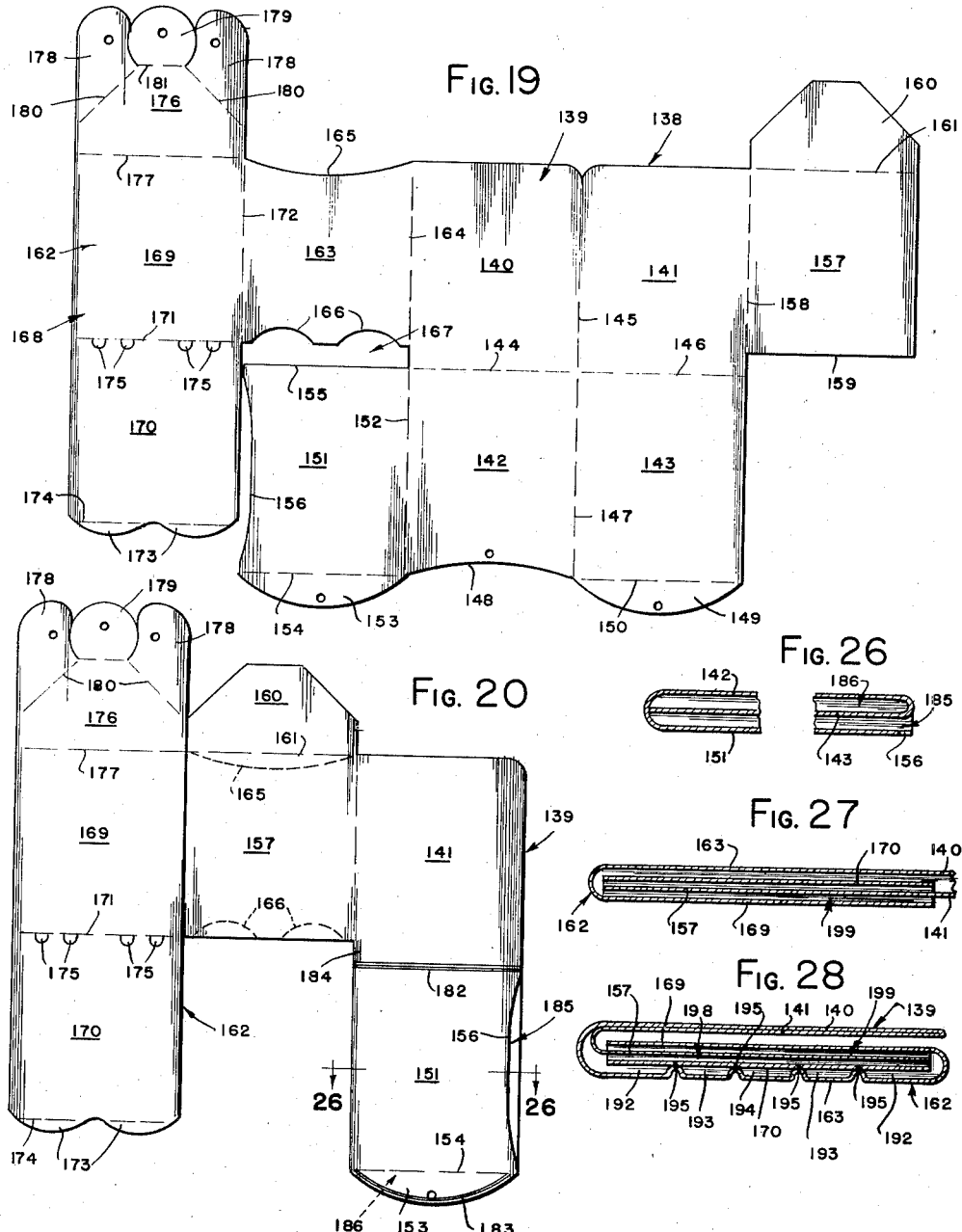

Dec. 9, 1958     H. M. HERBENER     2,863,485
BILL FOLDERS
Filed March 20, 1956     8 Sheets-Sheet 6
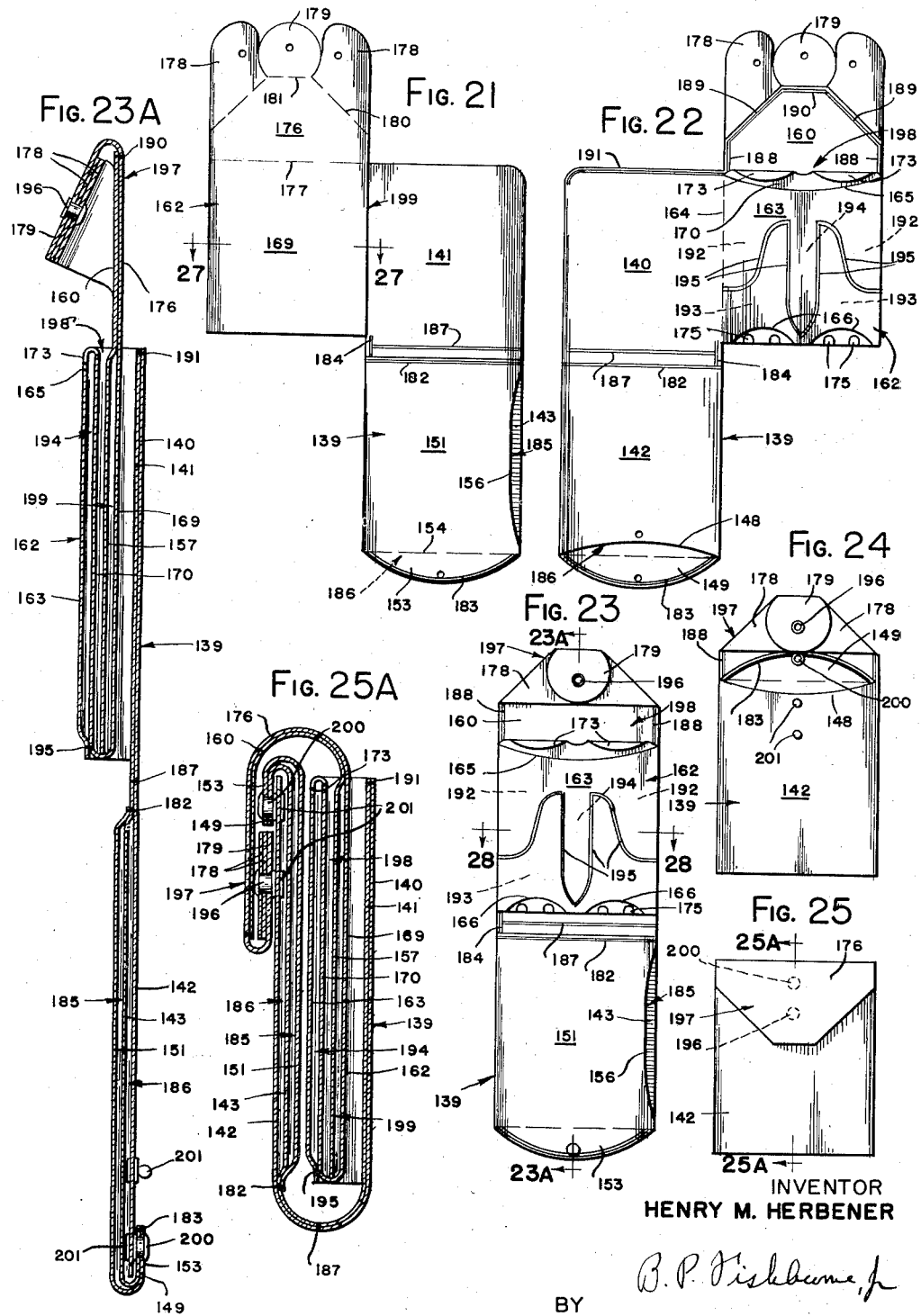
INVENTOR
HENRY M. HERBENER
BY
ATTORNEY Dec. 9, 1958   H. M. HERBENER   2,863,485
BILL FOLDERS
Filed March 20, 1956   8 Sheets-Sheet 7
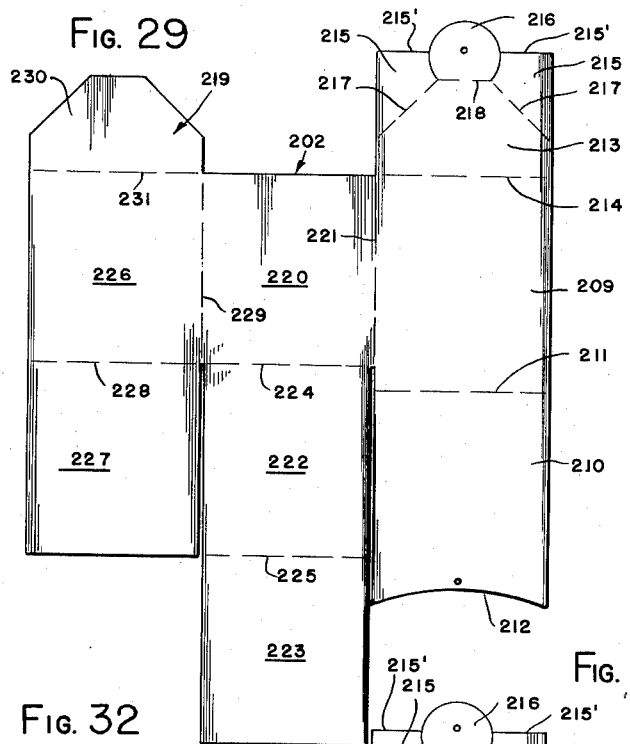
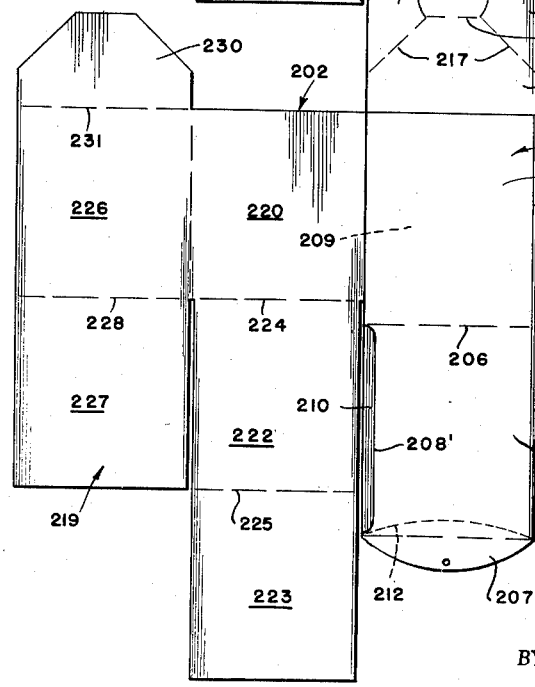
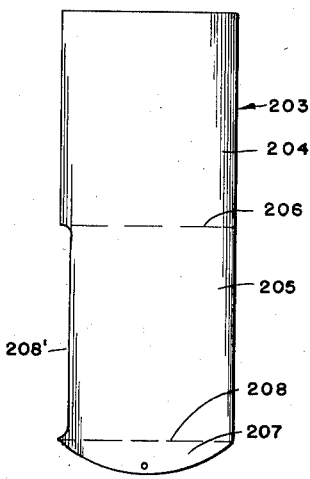
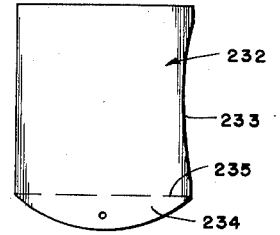
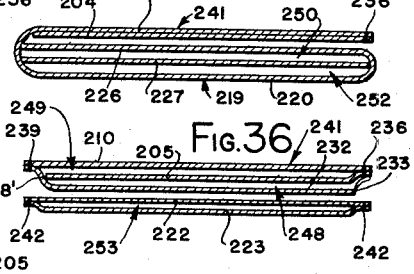
INVENTOR
HENRY M. HERBENER
BY
ATTORNEY

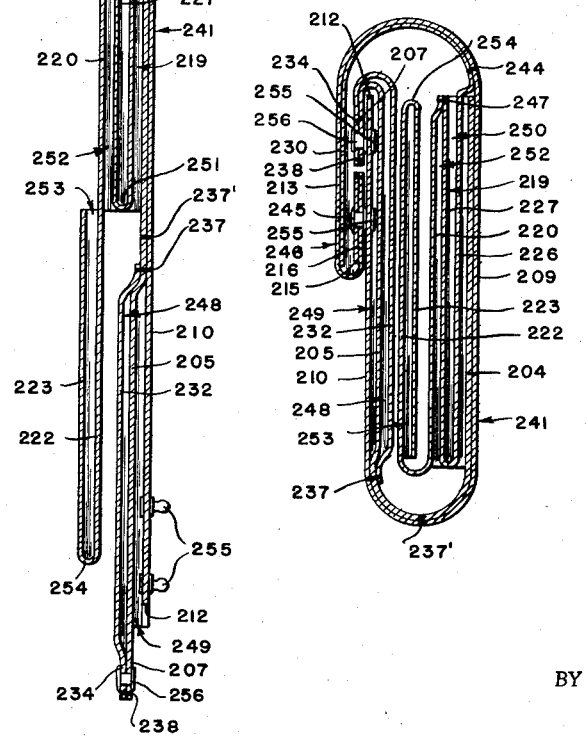

United States Patent Office 2,863,485
Patented Dec. 9, 1958

2,863,485

BILL FOLDERS

Henry M. Herbener, Thomasville, Ga.

Application March 20, 1956, Serial No. 572,693

20 Claims. (Cl. 150—35)

This invention relates to folders for bills or the like, and to pocket constructions.

An important object of the invention is to provide a bill folder, or the like, formed in a highly convenient and economical manner from a single unitary blank or sheet of flexible plastic material.

A further object is to provide from a single unitary blank of the above-mentioned type a novel combined bill folder, change purse, card case and key case or holder.

Another object of the invention is to provide a bill folder or the like, formed from a unitary blank, and embodying a minimum number of cut and welded edges, and a minimum number of edges formed by folding, the folded edges being greatly superior from a standpoint of strength and durability, and rendering the bill folder neat and attractive in appearance and long lasting in normal use.

A further object is to provide a bill folder or the like of the above-mentioned character, wherein the parts subject to the greatest wear and tearing stresses are formed as folded edges or walls of multiple thickness, the bill folder being extremely sturdy and durable throughout.

Another object is to provide in a bill folder of the above-mentioned character a novel coin cup of added strength and stiffness, whereby the cup will resist wear and bend more readily and uniformly in a desired manner.

A further object is to provide an improved coin pocket for coaction with the coin cup, the walls of the coin pocket being constructed so as to bend readily and separate in the desired manner when the coins are to be emptied into the coin cup.

Still another object is to provide a bill folder or the like having various pockets to receive cards, or the like, and constructed so that the cards will not catch upon the metal snaps of the bill folder, the snaps being positioned so as not to interfere with the insertion into or removal of the cards from the pockets.

A further general object is to provide a plastic bill folder or the like which will overcome the major inherent disadvantages of most plastic bill folders and similar devices of the prior art, due to its manner of construction which results in improved strength, durability, compactness and neatness throughout.

A further object of the invention is to provide a bill folder which will have a very large holding capacity, for the relatively small amount of material used to construct the folder.

A further object is to provide a bill folder which is thin and free of bulges, highly compact and simplified in construction, neat and attractive in appearance, and highly convenient to use.

Still another object is to provide a bill folder made from a unitary blank of sheet plastic material, of a type whereby the various sections or sides of the blank may be folded, and sealed or welded together, by the use of the die means shown in United States Patent 2,631,646.

Other objects and advantages of the invention will be apparent during the course of the following description.

Figure 7:
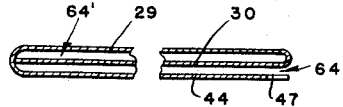
Figure 2:
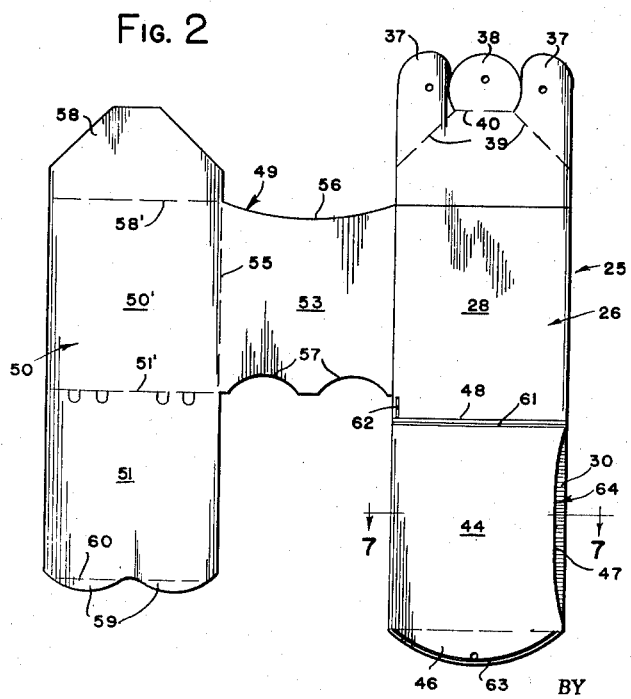

In the accompanying drawings, forming a part of this application, and in which like numerals are employed to designate like parts throughout the same, Figure 1 is a plan view of a unitary blank from which the bill folder is constructed, Figure 2 is a further plan view of the blank after certain parts thereof have been folded and welded together, Figure 3 is a further plan view of the blank, after additional parts have been folded during the formation of the bill folder, Figure 4 is a plan view of the completed bill folder in the open position, Figure 4a is an enlarged central vertical longitudinal section taken on line 4a—4a of Figure 4, Figure 5 is a plan view of the bill folder in the folded position, with the change cup and a pocket flap in open positions, to show snap fastener means, Figure 6 is a plan view of the folded and completely closed bill folder, Figure 6a is an enlarged central vertical section taken on line 6a—6a of Figure 6, Figure 7 is an enlarged horizontal transverse section taken on line 7—7 of Figure 2, part broken away, Figure 8 is a similar section taken on line 8—8 of Figure 4, Figure 10 is a plan view of a unitary blank from which a modified form of bill folder is constructed, in accordance with the invention, Figure 11 is a further plan view of the blank after parts thereof have been folded and welded together, Figure 12 is a further plan view of the blank after additional parts are folded and welded, Figure 13 is a plan view of a completed bill folder in the open position, Figure 13a is an enlarged central vertical longitudinal section taken on line 13a—13a of Figure 13, Figure 14 is a plan view of the modified bill folder in the folded position, with the change cup and associated pocket flap open to show snap fastener means, Figure 15 is a plan view of the folded bill folder in the completely closed position, Figure 15a is an enlarged central vertical section taken on line 15a—15a of Figure 15, Figure 16 is an enlarged fragmentary horizontal section taken on line 16—16 of Figure 11, Figure 17 is an enlarged horizontal transverse section taken on line 17—17 of Figure 11, part broken away, and, Figure 18 is an enlarged horizontal transverse section taken on line 18—18 of Figure 13, Figure 18b is a plan view, partly diagrammatic, on a reduced scale of the bill folder, Figures 10 to 18, and showing the hinged relation of the partition 98 relative to the body portion 80, Figure 19 is a plan view of a unitary blank used in the construction of a further modified form of bill folder, Figure 20 is a further plan view of the blank, after parts thereof have been folded and welded together, Figure 21 is a further plan view of the blank after additional parts have been folded and welded, Figure 22 is a further plan view similar to Figure 21 but showing the opposite side of the blank, in order to illustrate additional lines of welding, Figure 23 is a plan view of a completed bill folder in the open position, Figure 23a is an enlarged central vertical longitudinal section taken on line 23a—23a of Figure 23, Figure 24 is a plan view of the bill folder in the folded condition, with the coin cup extended and a pocket flap open to show snap fastener means, Figure 25 is a plan view of the folded and completely closed bill folder, Figure 25a is an enlarged central vertical section taken on line 25a—25a of Figure 25, Figure 26 is an enlarged horizontal transverse section taken on line 26—26 of Figure 20, Figure 27 is a similar section taken on line 27—27 of Figure 21, and, Figure 28 is a similar section taken on line 28—28 of Figure 23, Figure 29 is a plan view of a blank used in constructing a bill folder in accordance with a further modification of the invention, Figure 30 is a plan view of a blank section or side, separate from the blank of Figure 29, Figure 31 is a similar view of a pocket forming side or blank section, Figure 32 is a further plan view showing the blank section of Figure 30 superimposed upon the blank of Figure 29, Figure 33 is a further plan view showing the pocket forming side of Figure 31 superimposed upon the blank of Figure 29 and illustrating certain folding and welding operations during the formaton of the bill folder, Figure 34 is a plan view of the completed bill folder in the open position, Figure 35 is an enlarged transverse horizontal section taken on line 35—35 of Figure 34, Figure 36 is a similar section taken on line 36—36 of Figure 34, Figure 37 is an enlarged central vertical longitudinal section taken on line 37—37 of Figure 34, Figure 38 is a plan view of the bill folder in a folded condition with the coin cup and a pocket flap in open positions to show snap fastener means, Figure 39 is a further plan view of the bill folder in the folded and completely closed condition, Figure 40 is an enlarged central vertical section taken on line 40—40 of Figure 39.

In the drawings, where for the purpose of illustration are shown preferred embodiments of the invention, attention is directed first to Figures 1 to 8 inclusive, wherein the numeral 25 designates as a whole, a unitary blank from which the bill folder is constructed. The blank 25 is preferably formed of plastic material, and has sections adapted to be sealed or welded together by the use of the apparatus shown in United States Patent 2,631,646, or by similar means. If preferred, the blank 25 could be formed of leather, or the like, and the various parts or sections thereof after being folded, may be secured together by stitching.

In Figure 1, the plastic blank 25 comprises a generally rectangular area or body portion 26, which will form the body portion of the bill folder. This blank body portion 26 includes rectangular body portion sides 27, 28, 29 and 30, Figure 1. The body portion sides 27, 28, 29 and 30 are foldable upon lines 31, 32, 33 and 34, during the formation of the bill folder in a manner to be described. The fold lines may be imaginary lines, or they may be actual lines impressed in the plastic blank 25 by the welding die means, referred to above.

The body portion side 27, Figure 1, is provided at its outer end with a longitudinal extension 35, integral therewith, and of the same width as the side 27. The extension 35 is foldable upon a line 36, even with the adjacent edge 36' of the blank body portion 26. The extension 35 is generally rectangular, but is formed near its free end to provide rounded flaps 37 and 38, as shown, these flaps being foldable respectively upon diagonal lines 39 and a transverse line 40. The body portion side 30 is provided at its outer end with a curved transverse flap or tongue 41, integral therewith, and foldable upon a transverse line 42. The adjacent body portion side 29 has its end next to the flap 41 arcuately cut back or recessed at 43, as indicated.

The blank 25 further includes a generally rectangular pocket forming extension or side 44, integrally joined with the body portion side 29, and foldable with respect thereto upon a longitudinal line 45. The pocket forming side 44 is provided at its outer end with a flap or tongue 46, preferably identical in shape and size with the flap 41, and foldable upon a transverse line 46'. The outer longitudinal edge of the pocket forming side 44 is preferably cut back somewhat at 47, Figure 1, and the side 44 has an inner free transverse edge 48 as shown.

The numeral 49 designates a generally L-shaped partition portion of the blank 25, which forms a partition in the completed bill folder. The L-shaped partition portion 49 comprises an outer elongated section 50, including substantially rectangular areas or sides 50' and 51. The side 51 is free from connection with the pocket forming side 44, and is foldable upon a transverse line 51'. The L-shaped portion 49 further comprises an inner extension or side 53, integral therewith, and arranged between the sides 27 and 50', and foldable upon longitudinal lines 54 and 55. The side 53 has its outer end cut back arcuately at 56, and its opposite end is preferably scalloped, as shown at 57. The side or extension 53 terminates somewhat short of the adjacent edge 48 of pocket forming side 44, Figure 1, to form an opening or slot 57' in the blank 25. The elongated section 50 of partition portion 49 is provided at one end with an integral tapered extension 58, foldable upon a transverse line 58', as indicated. The extension 58 has its free end terminating in alignment with the fold line 40 of extension 35. The free end of side 51 carries a pair of small arcuate flaps 59, integral therewith, and foldable upon a transverse line 60. The flaps 59 terminate a considerable distance inwardly of the fold line 46' of pocket forming side 44, Figure 1.

In assembling or forming the bill folder from the unitary blank 25, the body portion sides 28 and 30 are first folded inwardly and upon the body portion sides 27 and 29, Figures 2 and 7, this folding taking place upon the lines 32 and 34. The pocket forming side 44 is now folded upon the line 45 to overlie the previously folded body portion side 30, the side 30 now being disposed between sides 29 and 44 as shown in Figure 7. The flaps 41 and 46 are now disposed in superposed registering relation, Figure 2.

At this time, it is advantageous to perform the first sealing or welding operation upon the bill folder. The sides 29, 30 and 44 are welded together adjacent their inner ends, Figure 2, by a transverse line of welding 61, which preferably extends entirely across the three superposed sides 29, 30 and 44. The body portion sides 27 and 28 are also secured together near their lower lefthand corners, Figure 2, by a short longitudinal line of welding 62, which may extend from the line of welding 61 to the adjacent scalloped end of the blank extension 53. If preferred, the line of welding 62, Figure 2, may extend for the full length of the body portion sides 27 and 28. In either event, the line of welding 62 extends through sides 27 and 28 only. The free edges of the flaps 46 and 41 may now be secured together by an arcuate line of welding 63, Figure 2. The line of welding 63 serves to connect the body portion side 30 and pocket forming side 44, adjacent the outer ends of the same. Although the sides 27 and 28 are secured together at this time by the line of welding 62 only, it should be pointed out that the line of welding 61 is adjacent to the inner ends of sides 27 and 28, Figure 2, and in effect also secures these ends together.

The construction thus far described provides a side opening pocket 64 in the bill folder between the sides 30 and 44, Figure 7, and a longitudinal end opening pocket 64', Figure 4a, between the sides 29 and 30. The cut back edges 47 and 43 of the respective sides 44 and 29 facilitate entry to the pockets 64 and 64' when introducing cards or the like into the same.

If desired, the major portion of the area of pocket forming side 44 may be transparent, to provide a window for viewing the contents of the pocket 64. This window is an optional feature, and if used, may be made in accordance with the teachings of my application Serial Number 560,235 filed January 19, 1956 for Folder and Pocket Constructions, which application discloses similar transparent windows for bill folder pockets.

As shown in Figure 3, the side 51 is now folded upon the fold line 51' to overlie the side 50', and these sides as a unit, are folded upon the line 55 to overlie the extension or side 53. In Figure 3, the side 51 is therefore disposed between sides 50' and 53, and at this stage, the bill folder is generally L-shaped as in Figure 3. Following this, the portion 49 of the bill folder embodying the folded sides 51, 50' and 53 is folded upon the line 54 so as to overlie the body portion side 28. The tapered extension 58 now covers or overlies the extension 35, Figures 4, 4a and 5, and the flaps 37 may now be folded upon the lines 39 into overlapping relation upon the extension 58, and the flap 38 is then folded upon the line 40 so as to lie upon the overlapped flaps 37. The thus folded flaps 37 and 38 may now be secured together by means of a socket element 65 of a conventional snap fastener, as shown.

The superposed extensions 58 and 35, Figures 4 and 4a, are now secured together at their longitudinal edges by short lines of welding 66, Figure 4, and these lines of welding extend only from the top of side 51, Figure 4, to the lower edges of the folded flaps 37. The lines of welding 66 serve the dual purpose of securing the extensions 35 and 58 together, and also securing the partition 49 of the bill folder to the body portion 26 thereof, Figure 4. If desired, the extensions 58 and 35 may be further secured together by a continuous line of welding, not shown, entirely about their marginal edges, under the flaps 37 and 38, Figure 4. This line of welding is not necessary, however.

The arrangement of the flaps 37 and 38 and extensions 35 and 58 forms upon one end of the bill folder a change cup 67, Figure 4a, having its outer side formed of double thickness, to prevent tearing, by virtue of the superposed extensions 35 and 58. The change cup 67 operates in conjunction with change or coins, as described in my prior Patents 2,277,104 and 2,346,433.

Generally longitudinal lines of welding 70 are employed for securing together the sides 53 and 51, Figure 4. To prevent the lines of welding 70 from securing the intermediate side 51 to the side 50', a rectangular copper plate or electrode is positioned between the sides 50' and 51 during the welding of the lines 70. With this arrangement, the lines of welding 70 effect the securing together of sides 51 and 53 only.

As shown in the drawings, the lines of welding 70 form between the sides 51 and 53 of partition 49 pairs of longitudinally oppositely opening key pockets 71 and 72, and an intermediate pocket 73 for a fingernail file or the like, the pocket 73 opening through the same end of partition 49 as the pockets 71. The general shape and function of the pockets 71, 72 and 73 in the bill folder is the same as for the corresponding pockets in my prior Patents 2,277,104 and 2,346,433.

As shown in Figure 4, pairs of small tabs or stop elements 72' are preferably formed in the side 51, adjacent the entrances to the key pockets 72, and adjacent the arcuate notches 57. These tabs are freely disposed, and will tend to project upwardly from the side 51 so as to form stops at the entrances to the pockets 72, in order to prevent the keys from slipping out of the pockets 72. The flaps 59 serve the same purpose in connection with the other key pockets 71, Figure 4. As shown in Figure 1, the tabs 72' may be formed by slitting the side or extension 51 adjacent to the line 51', while the blank is in the flat condition. If preferred, the tabs 72' may be omitted. It should be mentioned further that the tabs 72' are made small, so that the openings formed thereby in the side 51 are correspondingly small, and coins in the coin pocket, to be described, cannot pass through these openings.

It can now be seen that a change or coin pocket 74 is formed between sides 50' and 51, Figures 4a and 8, the inner end 74' of this pocket being closed and its outer end open, so that coins may be emptied into the coin cup 67. The partition 49, Figure 4, containing the several pockets 71, 72, 73 and 74 overlies body portion side 28 and the partition is free from connection with the body portion 26 along its edges 75 and 76, Figure 4. The arrangement is such that bills or paper money may be placed under the partition 49, or between it and the elongated body portion 26, Figure 4, prior to folding the bill folder. When folded, Figure 6a, these bills are doubled or folded about the lower free end of the partition 49, and the folded sections of body portion 26 are on opposite sides of and outwardly of the bills and partition.

It is to be noted further that the body portion 26, Figure 4a, is of double thickness throughout its entire length, and is actually three layers thick adjacent the side 44. Also, the flap at the entrance to pocket 64' is of double thickness, being composed of the flaps 41 and 46. Thus, the component parts of the bill folder which are subjected to the greatest wear or tearing stresses during use are formed of multiple thicknesses of the sheet plastic material, and the construction is therefore rendered strong and durable.

In Figure 5, the bill folder has the change cup 67 and the flap for the pocket 64' in the open position. The socket element 65 of a first snap fastener is shown, and a similar socket element 77 of a second snap fastener is shown secured to the flap 41. Companion snap fastener studs 78 are secured to the adjacent body portion side 29, Figure 5, for coaction with the corresponding socket elements 65 and 77. These elements coact to maintain the bill folder closed, as clearly shown in Figures 6 and 6a.

When the bill folder is thus closed, the partition 49 is disposed between the folded sections of the body portion 26, and the change cup and the extension 35—58 carrying it is arranged outwardly of the body portion side 29, Figures 6 and 6a.

In Figures 10 to 18 inclusive, there is shown a modified form of the invention, wherein the bill folder is also constructed from a single or unitary blank 79 of plastic material. The blank 79 comprises a generally rectangular body portion 80 including generally rectangular body portion sides 81, 82, 83 and 84, arranged as shown, and having fold lines 85, 86, 87 and 88. The body portion side 83 has its outer end arcuately cut back at 89, and the corresponding end of body portion side 84 has an integral arcuate flap 90 formed thereon, and foldable upon a line 91, transversely of the side 84. The outer longitudinal edge 82' of body portion side 82 is preferably cut back in the manner shown, for a purpose to be described.

Formed integral with the body portion side 83 is a generally rectangular pocket forming side or wall 92, foldable upon a longitudinal line 93, and having an arcuate flap 94 at its outer end, similar to the flap 90, and foldable upon a transverse line 95, as shown. The inner end 96 of side 92 is freely disposed, and the free longitudinal edge 97 of the side 92 is preferably cut back as indicated in Figure 10.

The blank 79 further comprises a partition forming portion 98, including a generally rectangular section or side 99, integrally connected with body portion side 81 and foldable with respect thereto upon a longitudinal line 100. The outer end of side 99, Figure 10, is in alignment with the corresponding ends of body portion sides 81 and 82, but the inner transverse end or edge 101 preferably terminates a considerable distance from the adjacent end 96 of the side 92. The side 99 is thus somewhat shorter than the sides 81 and 82. The side 92 is free of attachment to the partition portion 98.

Partition portion 98 further comprises an elongated longitudinal section 102, including rectangular sides 103 and 104, foldable upon a transverse line 105, adjacent the edge 101 of side 99. Partition side 103 is foldable with respect to the side 99 upon a longitudinal line 106, as shown. Side 103 has a longitudinal extension 107 formed integral therewith and foldable upon a transverse line 108. Extension 107 corresponds to the extension 35 of the blank 25, and includes flaps or tongues 109 and 110, which are preferably identical to the flaps 37 and 38 of blank 25, and foldable upon lines 111 and 112, as indicated.

The blank 79 further comprises a rectangular pocket reinforcing side or lining 113, formed integrally with the side 103 and foldable with respect thereto upon a longitudinal line 114. One end of the side 113 terminates at the line 105, as shown, and its other end carries an integral tapered extension 115, similar to the extension 58 in Figure 1, and foldable upon a transverse line 116, Figure 10. The inner side of extension 115 may be integrally joined with the extension 107 along a fold line 117, upon which the extensions 107 and 115 are foldable with respect to each other. If preferred, the extensions 107 and 115 may be separated or cut at the line 117. The extensions are of the same size and shape, as shown in Figure 10.

In Figure 11, body portion sides 82 and 84 are first folded upon the lines 86 and 88 so as to overlie body portion sides 81 and 83, Figure 16. Pocket forming side 92 is next folded upon line 93 so as to overlie body portion side 84, Figure 17. The flaps 94 and 90 now register, and are preferably secured together at this time by an arcuate line of welding 118. The opposite ends of sides 83, 84 and 92 are secured together by a transverse line of welding 119, and the lower left hand longitudinal edge portions of sides 81 and 82, Figure 11, are secured together by a short longitudinal line of welding 120. The body portion sides 81 and 82 are now further secured together at their outer free ends by a transverse line of welding 121, Figure 11.

The arrangement thus far described forms within the body portion 80 of the bill folder an inner side opening pocket 122, between sides 81 and 82, which pocket is closed at its ends by the lines of welding 119 and 121, and at its outer side by the folded relationship of sides 81 and 82, Figure 16. An outer side opening pocket 123 is formed between sides 84 and 92, Figures 11 and 17, and the ends of this pocket are closed by the lines of welding 118 and 119. The folded relationship of sides 83 and 92, Figure 17, serves to close the inner side or bottom of the pocket 123.

The construction in Figure 11 further provides an end opening pocket 124 between the sides 83 and 84, and the outer open end of this pocket is adapted to be closed or covered by the flap 90—94, which is a flap of double thickness, as previously described. The sides of longitudinal pocket 124, Figure 17, are closed by the folded relationship of the sides 83, 84 and 92. The inner end of pocket 124 is closed by the line of welding 119, Figure 13a.

With reference to Figure 12, the side or lining 113 and its extension 115 are now folded upon lines 114 and 117 so as to overlie the side 103 and tapered extension 107 in contacting superposed relation. At this time, the extensions 115 and 107 may be secured together at their longitudinal edges by short lines of welding 125. The flaps 109 and 110 may now be folded upon the lines 111 and 112 so as to overlie one another in superposed relation, Figure 12, and the three flaps are secured together by the socket element 126 of a conventional snap fastener. This arrangement forms upon the partly completed bill folder a flexible coin cup 127 corresponding to the coin cup 67 in the prior form of the invention.

It may be noted here that the outer side wall of the coin cup 127 is of double thickness, being formed by the superposed extensions 107 and 115. If preferred, the extensions 115 and 107 may be further secured together entirely about their marginal edges by a marginal line of welding, not shown, which line of welding, if used, will be under the flaps 109 and 110, Figure 13. The lines of welding 125 alone are sufficient, however, and the last-mentioned optional line of welding is not necessary.

The side 104 is now folded upon the transverse line 105 so as to overlie side 113, and the sides 103 and 104 now have the lining side 113 between them. Sides 103, 113 and 104 are now taken as a unit, and folded on line 106 so as to lie upon side 99, and the side 99 will be beneath the side 104. The device is further folded upon line 100, so that the four sides 99, 104, 113 and 103 all overlie the side 82, Figure 13, with the side 103 adjacent the side 82. These superposed sides 99, 104, 113 and 103 constitute the folded partition 98 of the bill folder.

After these folding operations, and preferably while the bill folder is disposed as in Figure 13, the sides 81 and 103 only, Figure 18, are secured together at their longitudinal edges adjacent the line of welding 120 by a longitudinal line of welding 129. If desired, this line of welding may also secure the side 113 or lining to the side 103, but this is not necessary. The line of welding 129 will not secure the side 82 to the sides 81 and 103, Figure 18, because the side 82 is cut back at 82', as shown.

The sides 99 and 104, Figure 13, now have their outer ends secured together by a transverse line of welding 130, and a copper plate or electrode is placed between the sides 104 and 113 at this time, so that the line of welding 130 will not effect the securing together of the sides 104 and 113, but only the securing together of the sides 99 and 104. A longitudinal pocket 131 is now formed between the sides 99 and 104, which pocket has its inner end open, adjacent the cut back edge 101. The outer end of the pocket 131 is closed by the line of welding 130 and its opposite sides are closed by the folded relationship of the several sides of the partition 98, as shown in Figure 18. It may be mentioned here that the line of welding 129 tends to stiffen the bill folder along its longitudinal edge to the left and adjacent the partition 98, Figure 13, so that the partition 98 will tend to remain in overlying or superposed relation to the elongated body portion 80. This will enable the user of the bill folder to know at a glance that the bills are to be arranged between the partition 98 and the body portion 80. The entire partition 98 is, of course, relatively freely swingable upon the fold line 100 at all times away from its overlying or superposed relation to the body portion 80 and this is shown diagrammatically in Figure 18b of the drawings. The line of welding 129 aids the partition 98 in returning to its position shown in Figure 13. The arrangement whereby the partition 98 in the finished bill folder is freely swingable to and from its relative positions shown in Figures 13 and 18b, distinguishes the present form of the invention from the form first described, Figures 1 to 8, wherein the partition 49 of the finished bill folder always remains superposed upon the elongated body portion 26, Figure 4, due particularly to the line of welding 66, which permanently secures the partition 49 to the bill folder body portion 26. An additional transverse line or lines of welding 132 may be formed through the body portion sides 81 and 82 just above the line of welding 119, Figure 13, merely for the purpose of facilitating bending or transverse folding of the elongated body portion 80 in the manner shown in Figure 15a. I also wish to emphasize that the change cup 127 is integral with and bodily carried by the partition 98, through the medium of the superposed extensions 107 and 115 and the associated sides 103 and 113. The use or operation of the coin cup in conjunction with the coin pocket 133 is as described in my prior Patents 2,277,104 and 2,346,433.

The coin pocket 133, mentioned above, is formed in the partition 98, Figure 13, behind or under the pocket 131, and between the sides 113 and 104, as best shown in Figure 18. The outer end of the coin pocket 133 is open, adjacent the coin cup 127, whereas its opposite end and its two sides are closed, as shown in the drawings, by folded edges.

In Figure 14, the snap fastener socket 126 is shown, and a similar snap fastener socket 134 is shown secured to the flap 90—94. Coacting snap fastener studs 135 for the socket elements 126 and 134 are secured to the adjacent body portion side 83, as shown. The arrangement is such that the flap 90—94 is used for closing the pocket 124, and the coin cup 127 with the extensions 115 and 107 are folded over the side 83, as shown in Figures 15 and 15a for securing the entire bill folder closed.

In the completed bill folder, Figures 13 to 15a, the partition 98 including the change cup 127 is free from attachment to the body portion 80, except at the line 100, adjacent the line of welding 129. The body portion sides 81 and 82 form behind the partition 98, Figures 13 and 18, a flap or wall of double thickness, which is adjacent to the partition side 103. In use, the bills or paper money are laid flat and lengthwise upon the body portion sides 82 and 92, Figure 18b, and the partition 98 is then folded over the bills to the position of Figure 13. The bill folder is now folded, Figure 15a, and the bills are wrapped about the inner end of the partition 98. When the bill folder is completely closed, Figure 15a, the bills may be stripped from the partition 98 by a lateral stripping movement outwardly from the free longitudinal edge 136 of the partition 98, at which time the free corner 137 of the flap 81—82 is bent or rolled outwardly from the partition to aid in this stripping operation. This mode of operation is completely described in my Patents 2,277,104 and 2,346,433.

In Figures 19 to 28 inclusive, there is shown a further modification of the invention, wherein the bill folder is constructed from a unitary blank 138 of the identical plastic material used in the blanks 79 and 25. The blank 138 comprises a central generally rectangular body portion 139, which will make up the elongated body portion of the finished bill folder. The rectangular blank body portion 139 comprises substantially rectangular body portion sides 140, 141, 142 and 143, having transverse and longitudinal fold lines 144, 145, 146 and 147, as shown. The body portion side 142 has its outer end cut back on an arc at 148, and the corresponding end of side 143 carries an arcuate flap 149, integral therewith, and foldable upon a transverse fold line 150.

A pocket forming side or panel 151 is integrally joined to body portion side 142 along a longitudinal fold line 152, and the outer end of side 151 carries an integral flap 153, like the flap 149, and foldable upon a transverse fold line 154. The opposite transverse end 155 of side 151 is freely disposed and in alignment with the fold lines 144 and 146. The free longitudinal edge 156 of pocket forming side 151 is preferably cut back, as shown.

A coin pocket lining or reinforcing side 157 is integrally joined with the body portion side 141, along a longitudinal fold line 158, and the side 157 is rectangular, and has its inner end 159 terminating inwardly of the line 146, as shown in Figure 19. The lining side 157 carries an integral tapered extension 160, similar to the extensions 115 and 58, and this extension 160 is foldable upon a transverse fold line 161, in alignment with the adjacent transverse edges of body portion sides 140 and 141.

The blank 138 further comprises a generally L-shaped partition portion 162, including a transverse side or extension 163, integral with the body portion side 140, along a longitudinal fold line 164. The side 163 has its outer end 165 cut back on an arc as shown, and its opposite or inner end is arcuately notched as at 166. The end of the side 163 having the notches 166 is spaced from the end 155, Figure 19, forming a slot or opening 167 in the blank 138, and the side 163 is thus somewhat shorter than the sides 140 and 141, and is preferably of the same length as the lining side 157. It may be mentioned here that pocket forming side 151 is entirely free of attachment to the L-shaped partition portion 162.

The partition portion 162 further comprises an elongated longitudinal section 168, embodying substantially rectangular areas or sides 169 and 170, the side 170 being foldable upon a transverse fold line 171, in substantial alignment with the adjacent end of the side 163. Side 169 is foldable upon a longitudinal fold line 172, as shown, and the sides 163 and 169 are integral, as shown. At its outer end, the side 170 carries a pair of small arcuate flaps 173, integral therewith, and foldable upon a transverse fold line 174. The flaps 173 correspond in construction and function to the flaps 59 in the first form of the invention. Adjacent the line 171, side 170 is slit at a plurality of transversely spaced points, to form a corresponding number of small tongues or stop elements 175, integrally joined thereto at the line 171. The elements 175 correspond in construction and purpose to the tabs or stop elements 72' of the first form of the invention.

At its end remote from side 170, partition portion side 169 carries an integral longitudinal extension 176, foldable upon a transverse line 177 which is in alignment with the line 161. The extension 176 is formed to provide the flaps 178 and 179, integral therewith, and foldable upon diagonal and transverse lines 180 and 181, Figure 19. The flaps 178 and 179 correspond in construction and function to the flaps 109 and 110 and the flaps 37 and 38, previously described.

With reference to Figure 20, the body portion sides 141 and 143 are folded upon the line 145 and 147 so as to overlie body portion sides 140 and 142. The pocket forming side 151 is now folded on line 152 into overlying relation with side 143, Figures 20 and 26. At this point, the superposed sides 151, 143 and 142 are preferably secured together at their inner ends by a transverse line of welding 182, as shown. The flaps 149 and 153 are now in superposed registering relation, and are secured together by the arcuate line of welding 183. The line of welding 183 does not effect the side 142, which is cut back at 148. The sides 140 and 141, Figure 20, may now be secured together adjacent corresponding longitudinal edges by a short longitudinal line of welding 184, which extends only from the line of welding 182 to the adjacent transverse edge of the lining side 157, Figure 20. The line of welding 184 effects the joining of sides 140 and 141 only.

The above-described welding, Figure 20, results in the formation of a side opening pocket 185, Figure 26, substantially identical with the pocket 123 shown in Figure 11. An end opening pocket 186 is also formed between sides 142 and 143, and this pocket may be identical with the pocket 124 previously described in connection with Figure 11. The open end of the pocket 186 is adapted to be closed by the flap 153—149, which is a double thickness flap.

With reference to Figures 20 and 21, the side 170 may now be folded upon the line 171 so as to overlie side 169, and these two sides are now folded as a unit with the extension 176 into overlying relation with the side 163, and the lining side 157 is simultaneously slipped between the superposed sides 170 and 169. The sides 169, 157, 170 and 163 will now be in superposed relation, Figures 21, 22 and 27. At this time, or at any other suitable time, an additional transverse line or lines of welding 187 may be formed through the sides 140 and 141 only, just above the line of welding 182, Figure 21. The purpose of the line or lines of welding 187 is merely to facilitate the subsequent bending or folding of the elongated body portion 139 of the bill folder, at or near its longitudinal center. The line of welding 187 may be omitted entirely, if preferred.

Viewing the opposite side of the partially completed bill folder, Figure 22, the tapered extensions 160 and 176 are now in superposed registering relation, and are preferably secured together entirely about their marginal edges by lines of welding 188, 189 and 190, as shown. At this time, the free transverse ends of body portion sides 140 and 141 are preferably secured together by a transverse line of welding 191, Figure 22.

With continued reference to Figure 22, the now nearly completed bill folder partition 162 is provided with opposed pairs of longitudinal key pockets 192 and 193, and with an intermediate longitudinal pocket 194 for a fingernail file or the like. These pockets 192, 193 and 194 are formed between partition sides 163 and 170, by generally longitudinal lines of welding 195, Figure 22. The lines of welding 195 may be identical with the lines of welding 70, Figure 4, in the first form of the invention, and the resultant pockets 192, 193 and 194 are identical in construction and purpose with the pockets 71, 72 and 73, Figure 4. Also, the flaps 173 and the small tabs or stops 175, Figure 22, serve the same purposes, with relation to the pockets 192 and 193 that the flaps 59 and tabs 72' serve with relation to the key pockets 71 and 72 of the first form of the invention. When the lines of welding 195 are formed, a copper plate is slipped between the sides 170 and 157, so that these sides will not be welded together, and so that the lines of welding 195 will secure together only the sides 163 and 170, as best shown in Figure 28.

After the welding operations of Figure 22, reference is again made to Figure 21 and also to Figure 23 which shows the completed bill folder in the open or unfolded condition. In these figures, the nearly completed partition 162 is now folded over the elongated body portion 139, so that the partition 162 overlies the body portion side 141, Figure 23. At this time, or at any other suitable time, the flaps 178 and 179 are secured together by the socket element 196 of a conventional snap fastener, for completing the construction of the flexible coin cup 197, as shown. This coin cup 197 is identical in construction and operation with the coin cup 127 of the second form of the invention and it is to be noted that the outer side wall of the coin cup 197 is of double thickness, being formed by the superposed extensions 160 and 176.

It may now be seen that within the partition 162, there is formed between the sides 157 and 170, a longitudinal coin pocket 198, open at its outer end adjacent to the coin cup 197. This coin pocket coacts with the coin cup 197 in the same manner which the coin cups and pockets in the prior forms of the invention coact. Also, a side opening or secret pocket 199 is formed between partition sides 157 and 169, as shown. Access to the pocket 199 may be had only when the partition 162 is disposed laterally of the body portion 139, as in Figure 21.

As shown in Figure 24, the flap 149—153 carries a snap fastener socket element 200, similar to the socket element 196. A pair of coacting snap fastener studs 201 are secured to the body portion side 142, and positioned to enter the sockets 196 and 200 when the flap 149—153 and the coin cup 197 are folded over the side 142, Figures 25 and 25a. By this means, the folded bill folder is secured completely closed.

The manner of using the bill folder in Figures 19 to 28 is the same as previously described in connection with the second form of the invention, Figures 10 to 18b, and a further description of the use or operation of the bill folder should be unnecessary.

It may now be seen that I have provided a novel bill folder, formed of a single or unitary blank of sheet plastic material, parts of which are secured together by the various lines of welding, as shown and described.

While I have shown and described a certain sequence or order of welding steps in the making of the bill folders from the several blanks, it should be understood that the order of the welding steps may be changed as found desirable, and I do not wish to limit the invention to any particular sequence of folding or welding operations with respect to the several blanks and bill folders.

With respect to the drawings, particularly the enlarged sectional views through the completed bill folders, it should be understood that the various pockets are shown separated or open, for the purpose of illustration, and this condition is exaggerated in the drawings, as for example in Figures 6a, 15a and 25a, wherein the bill folder appears thick or bulky, which is not the case in actual practice.

In all three forms of the invention, thus far described, the elongated body portion of the completed bill folder is at least of double thickness throughout its entire length. Also, the outer side walls of the coin cups on the three forms of bill folders are of two ply or double thickness, to resist tearing. The entire construction is extremely sturdy and durable, and all parts subject to the greatest wear and tearing stresses are suitably reinforced or of multiple thickness. In the first form of the invention, Figures 1 to 8, the partition 49 is permanently held in superposed or overlying relation to the body portion 26, due to the fact that the extension 35 is carried by the body portion 26 and the extension 58 is carried by the partition 49, and these two extensions are secured together by the lines of welding 66. Thus, in the first form of the invention, the bills or paper money are slid under the partition 49 and between it and the body portion 26, Figure 4, and the bill folder is opened as in Figure 4 for removing and inserting paper money or bills.

In Figures 1 to 8, the body portion sides 27 and 28 underlying partition 49 do not form upon the folded or closed bill folder a flap having one corner free of attachment to the partition which may be rolled back to facilitate the stripping or removing of bills from the closed bill folder, as particularly described in connection with the second form of the invention. This last-mentioned flap feature is common to the second and third forms of the invention, Figures 10 to 28 inclusive. In these forms, the coin cups 127 and 197 are bodily carried by the movable partitions 98 and 162, respectively, which partitions and coin cups are not permanently secured to the longitudinal body portion of the bill folder as by the line of welding 66 in the first form of the invention. Hence, the bill folders of the second and third forms may assume generally the shape or position shown in Figure 18b, whereas the completed bill folder of Figures 1 to 8 cannot do this.

I have thus far provided three distinct forms of bill folders, one of which, Figure 4, has its partition 49 remaining in superposed relation to the body portion 26 at all times, although its edges 75 and 76, Figure 4, are freely liftable from the body portion 26. In Figures 13, 18 and 18b, there is provided a bill folder in which the partition 98 will tend to assume an overlying relationship with the body portion 80, due to the action of the line of welding 129, previously referred to. However, the partition 98 may be shifted to the position shown in Figure 18b for the placing of bills upon the body portion 80. Finally, in Figures 22 and 23, there is provided a bill folder wherein the partition 162 is freely hinged or swingable along its longitudinal line of attachment to the body portion 139, so that the partition may either overlie the body portion 139 or be spaced laterally thereof as in Figures 22 or 18b.

In Figures 29 to 40, there is shown a further modification, wherein the numeral 202 designates a blank of the identical flexible sheet plastic material mentioned in connection with the prior forms of the invention. There is also provided apart or separate from the blank 202, an elongated generally rectangular blank section 203, including body portion sides 204 and 205, foldable upon a transverse fold line 206, as indicated. The body portion side 205 is provided at its free end with an integral arcuate flap 207, foldable upon a transverse line 208. One longitudinal edge 208' of the body portion side 205 may be cut back as shown in Figure 30.

The blank 202 comprises generally rectangular body portion sides 209 and 210, foldable upon a transverse line 211. The outer end of the side 210 is arcuately cut back as at 212. The outer end of the body portion side 209 carries an integral coin cup extension 213, foldable upon a transverse line 214. Extension 213 carries flaps 215 and 216, as shown, foldable upon the lines 217 and 218. The flaps 215 differ from the corresponding flaps in the prior forms of the invention, in that they have straight transverse free edges 215', as indicated.

The blank 202 additionally comprises a partition portion 219, including a rectangular section or side 220, integrally secured to and foldable upon the body portion side 209, along a longitudinal line 221. The side 220 is somewhat shorter than the side 209, as shown in Figure 29, and its outer or free edge is in alignment with the transverse line 214, whereas its opposite end terminates short of the line 211, Figure 29. Longitudinally disposed rectangular pocket forming sides 222 and 223 are integrally joined with each other and with the side 220, and are foldable upon transverse lines 224 and 225. The line 224 is out of alignment with the line 211, as shown. Sides 222 and 223 are free of attachment to the sides 209 and 210, along the opposed longitudinal edges of these sides, Figure 29. Partition portion 219 further comprises an outer pair of longitudinally disposed rectangular sides 226 and 227, integrally connected and foldable upon a transverse line 228, which line is in alignment with the fold line 224. Partition side 226 is integrally joined to the side 220 and foldable with respect thereto upon a longitudinal line 229. The sides 220 and 226 and 222 and 227 are of equal length, and are in side by side relation in the blank 202, Figure 29. The sides 222 and 227 are free from attachment along their opposed longitudinal edges. The side 223 extends longitudinally beyond sides 210 and 227 in the flat blank, as shown. A second or companion coin cup extension 230 is integrally joined to the outer end of side 226, and foldable upon a transverse line 231, which is in alignment with the line 214. Extension 230 is adapted to register with extension 213 in the identical manner previously described in connection with corresponding elements of the prior forms of the invention.

In addition to the blank 202 and blank section 203, there is provided a separate generally rectangular pocket forming side 232 having one longitudinal edge 233 cut back, as shown, and also having an integral arcuate flap 234 at one end thereof, foldable upon a transverse line 235.

In the construction of the bill folder, Figures 29 to 40, the blank section 203 is superimposed upon the body portion sides 209 and 210, Figure 32, and the sides 204 and 205 register with sides 209 and 210. At this time, the outer longitudinal edges of the several sides 204, 205, 209 and 210 are preferably secured together by a continuous longitudinal line of welding 236, as shown. Following this, pocket forming side 232 is placed upon body portion side 205, Figure 33, and the flaps 234 and 207 are arranged in registration. The sides 232, 205 and 210 at this time are secured together at their inner ends by a transverse line of welding 237. The flaps 234 and 207 may now be secured together by an arcuate line of welding 238. Sides 232 and 210 are additionally secured together along their inner longitudinal edges, Figure 33, by a longitudinal line of welding 239. This line of welding 239 will not affect the side 205, between sides 232 and 210, due to the fact that side 205 has its adjacent edge 208' cut back, as shown. The longitudinal line of welding 239 which extends between lines of welding 237 and 238 is preferably extended, Figure 33, so as to additionally secure together the body portion sides 204 and 209, as indicated at 240, Figure 33. The short line of welding 240 thus may form a continuation of the line of welding 239, and if preferred, the line of welding 240 may extend for the full length of side 204, so as to join it to the side 209 throughout the entire lengths of such sides. This additional welding is not needed, however, and accordingly has not been illustrated in Figure 33.

During the above formation of the body portion 241 of the bill folder, and at substantially the same time, the side 223 may be folded upon the line 225 so as to underlie the side 222, Figure 33. These sides are now preferably secured together at their longitudinal edges by longitudinal lines of welding 242, Figure 33. Subsequent to this, partition side 227 is folded upon side 226, and both of these sides as a unit are folded over upon the side 220. The thus folded partition, including the depending sides 222 and 223 is now folded so as to overlie the body portion 241, longitudinally thereof, Figure 34, and the folding of the bill folder is now substantially completed.

The tapered extension 230 is now in registration with the extension 213, Figure 34, and these extensions are secured together by longitudinal lines of welding 243, and also by one or more transverse lines of welding 244, which also facilitate the subsequent bending or hinge action of the coin cup with respect to the body portion of the bill folder. If desired, the extensions 230 and 213 may be additionally welded together about their entire marginal edges, as defined by the lines 217 and 218, but this additional welding is not necessary. The flaps 215 are now folded inwardly to lie upon the extension 230, and the straight edges 215' will abut, but the flaps 215 do not overlap as in the prior forms of the invention. The flap 216 is now folded over the flaps 215, and the three flaps are secured together by the circularly curved line of welding 216', Figure 34. A copper plate is placed between the flaps and the extension 230, to prevent the flaps from being welded thereto. A snap fastener socket element 245 is now applied to the flaps, as shown, to complete the formation of the coin cup 246. The arrangement is such that the side of the coin cup 246 formed by the flaps 215 and 216 is of two thicknesses only, rather than three thicknesses as in the prior forms of the invention.

Partition sides 220 and 227 are additionally secured together adjacent to their outer ends by a transverse line of welding 247, Figure 34. A copper plate may be arranged between sides 226 and 227 at this time, to prevent the line of welding 247 from affecting side 226. This operation completes the formation of the bill folder, Figure 34, and the lines of welding 243 and 244 now maintain the partition 219 permanently in superposed relation with the longitudinal body portion 241. The sides 222 and 223 extend longitudinally of the partition and constitute a part or extension of it, and these sides normally overlie the side 232 when the bill folder is open or unfolded as in Figure 34. The sides 222 and 223 are, however, free from attachment to the bill folder body portion 241, and the sides 222 and 223 are foldable so as to overlie the partition side 220, when this is desired, or when the bill folder is closed, Figure 40.

The construction as above described provides in the elongated body portion 241 a side opening pocket 248, between sides 232 and 205. A longitudinal end opening pocket 249 is formed between body portion sides 205 and 210, as shown. The inner end of the pocket 249 is closed by the line of welding 237, and its sides are closed by the lines of welding 236 and 239. The closed margins of the pocket 248 are also defined by the lines of welding 237, 239 and 238.

A coin pocket 250 is formed between partition sides 226 and 227, as shown, and the inner end of this pocket is closed at 251 by the folded relation of the sides 226 and 227. An oppositely end opening pocket 252 is formed between the partition sides 220 and 227, Figure 37, and the outer end of this pocket is closed by the line of welding 247. A further longitudinal end opening pocket 253 is formed between sides 222 and 223, as shown. The side edges of this pocket are closed by the lines of welding 242, and the folded relationship of the sides 222 and 223 closes one end of the pocket 253, at 254.

Bills or paper money, just as in the prior forms of the invention, are inserted between the partition 219 and body portion 241, Figure 37. When the bill folder is extended as in Figure 37, these bills will also lie between the opposed sides 222 and 232. When the bill folder is folded and closed as in Figure 40, the bills and the sides 222 and 223 will be disposed between the folded partition 219 and the folded or doubled bill folder body portion 241.

As shown in Figure 38, the bill folder is provided with a pair of snap fastener stud elements 255, secured to the body portion side 210. These elements 255 coact with the socket element 245 of coin cup 246, and with a similar snap fastener socket element 256 carried by the flap 207—234, when the bill folder is closed, Figures 39 and 40. The arrangement is identical with that shown and described in connection with the prior forms of the invention, as regards the snap fastener elements.

It may now be seen that in Figures 29 to 40, there is provided a bill folder having a maximum number of pockets. The arrangement also provides for a welded connection at the outer longitudinal edges of body portion sides 204 and 209 and 205 and 210. This is afforded by the line of welding 236. In this respect, the bill folder of Figures 29 to 40 differs from the prior forms of the invention, wherein the corresponding outer longitudinal edge of the bill folder body portion was formed by folding.

Additionally, the bill folder of Figures 29 to 40 presents generally the appearance of a conventional two sides bill folder, when in the open position, Figures 34 and 37, due to the inclusion of the pocket forming sides 222 and 223. This is helpful to some users of the bill folder, who have been used to conventional bill folder constructions, and these individuals will know at a glance that the bills will be placed between the sides 204 and 226 and 232 and 222, Figure 37. This arranging of the bills is not as obvious to some users in the prior forms of the invention, and instructions are sometimes necessary. The use or operation of the coin cup 246, in conjunction with the coin pocket 250 is the same as previously described in connection with the prior forms of the invention. The bill folder in Figures 29 to 40 is similar to the bill folder of Figures 1 to 8, the first form, in that the coin cup 246 has an outer wall of double thickness, formed by the extensions 230 and 213. The extension 213 is carried by the outer side or body portion 241 of the bill folder, and the flap 230 is carried by the inner side or partition 219. When the extensions 230 and 213 are secured together by the lines of welding 243 and 244, the partition 219 is held or secured in superposed relation upon the body portion 241, Figures 34 and 37.

It is to be understood that the forms of the invention herewith shown and described are to be taken as preferred examples of the same, and that various changes in the shape, size and arrangement of parts may be resorted to, without departing from the spirit of the invention or the scope of the subjoined claims.

Having thus described my invention, I claim:

1. A blank of flexible sheet material for use in constructing a bill folder, comprising a rectangular body portion including rectangular sides foldable upon each other, a generally L-shaped partition portion including rectangular sides foldable upon each other and secured to one body portion side, means for securing certain of the body portion sides to each other and certain of the partition portion sides to each other, and coin cup forming extension means carried by said blank at one end thereof.

2. A blank of flexible sheet material for use in making a bill folder, comprising a rectangular body portion including rectangular sides foldable upon each other, a pocket forming side secured to one body portion side and foldable over certain of the body portion sides after folding of such body portion sides, a generally L-shaped partition portion including rectangular sides foldable upon each other, said partition portion being secured to one body portion side and free from attachment to the pocket forming side, means for securing certain of the body portion sides to each other and certain of the body portion sides to the pocket forming side and certain of the partition portion sides to each other, and coin cup extension means carried by one end of said blank.

3. A bill folder comprising a substantially rectangular body portion foldable longitudinally and transversely, a pocket forming side secured to the body portion and foldable upon the same after the body portion is longitudinally folded, a partition portion secured to the body portion and foldable transversely and longitudinally and then foldable as a unit over the longitudinally folded body portion, the folded partition portion then being spaced longitudinally on the folded body portion from said pocket forming side, means securing selected body portion sides together and selected partition portion sides together in the finished bill folder, and means forming a flexible coin cup upon one end of the completed bill folder.

4. A bill folder, comprising a rectangular body portion having a plurality of rectangular body portion sides adapted to be arranged in superposed relation, a generally L-shaped partition portion secured to one edge of one body portion side, said partition portion having a plurality of rectangular sides foldable upon each other and then foldable as a unit upon certain of the superposed body portion sides, superposed extensions forming a flexible change cup at corresponding ends of the folded body portion and partition portion when such portions are in superposed relation, and means securing certain of the superposed body portion sides to each other and certain partition portion sides to each other and the superposed extensions to each other.

5. A bill folder comprising a unitary blank, said blank including a foldable body portion which is substantially rectangular, a substantially rectangular pocket forming side secured to one longitudinal edge of the foldable body portion and extending for substantially one-half the length of said body portion, a change cup extension secured to the transverse edge of the body portion remote from the pocket forming side and extending for substantially one-half the width of the body portion, a generally L-shaped foldable partition portion secured to the longitudinal edge of the body portion adjacent the pocket forming side and having a section in side by side relation to the pocket forming side and an elongated longitudinal section spaced laterally outwardly of the pocket forming side, a second change cup extension secured to the transverse edge of said elongated longitudinal section of the partition portion and disposed in superposed relation with the first-named change cup extension when the body portion and partition portion are in folded superposed relation, and means for securing said change cup extensions together.

6. A bill folder comprising a rectangular body portion including pairs of rectangular sides foldable upon each other, a substantially L-shaped foldable integral extension for said body portion carried by one side of the body portion, a pocket forming side carried by another side of the body portion and foldable upon a pair of the body portion sides, a first change cup extension carried by one end of the body portion, a second change cup extension carried by the corresponding end of said L-shaped integral extension, and means for securing certain body portion sides to each other and certain body portion sides to the pocket forming side and the first and second change cup extensions to each other.

7. A bill folder comprising an elongated transversely foldable body portion of flexible sheet material and being of at least two thicknesses of the material throughout its length, means forming a pocket in said body portion adjacent one end of the same between said two thicknesses of material in the body portion, a pocket forming side associated with said one end of the body portion for forming thereon a second pocket, a coin cup extension secured to the opposite end of the body portion, a partition secured to one longitudinal edge of the body portion near its end remote from the pocket forming side and foldable upon the body portion, and a coin cup extension carried by one end of the partition and adapted to register with the first-named coin cup extension and secured thereto.

8. A bill folder comprising a unitary blank of flexible sheet plastic material of a type adapted to be welded, said blank including a foldable rectangular body portion, lines of welding securing together sections of said body portion when the same is folded, a generally L-shaped foldable partition portion, lines of welding securing together sections of the partition portion when the same is folded, means forming a change cup bodily carried by one end of the partition portion and free from connection with the body portion, and means forming a pocket upon the body portion near its end remote from said change cup.

9. A bill folder comprising a blank of sheet material, said blank including a generally rectangular body portion having sides foldable upon each other, a generally L-shaped partition portion carried by one body portion side and having sides foldable upon each other and then foldable as a unit over one pair of sides of the folded body portion, a coin cup extension secured to one end of one partition portion side, a lining side secured to one body portion side and adapted to be arranged between a pair of said partition portion sides when such sides are folded upon each other, and a second coin cup extension secured to one end of the lining side and adapted to register with the first-mentioned coin cup extension in the folded partition of the bill folder.

10. A unitary blank of sheet material to be used for forming a bill folder, said blank comprising a foldable body portion, a pocket forming side secured to one edge of said body portion and foldable upon parts of the body portion when the latter is folded, a generally L-shaped partition portion secured to the edge of the body portion having the pocket forming side secured thereto and free of attachment to the pocket forming side and being foldable over parts of the folded body portion and then being spaced longitudinally on the folded body portion from the pocket forming side, a lining side secured to the opposite edge of said body portion and adapted to enter between portions of the folded L-shaped partition portion when said body portion and partition portion are folded, a first coin cup extension secured to one end of the L-shaped partition portion and extending longitudinally beyond the corresponding end of the body portion, and a second coin cup extension secured to the corresponding end of said lining side and adapted to register in assembly with the first coin cup extension to form a coin cup having a side of double thickness.

11. A bill folder comprising an elongated body portion including pocket forming means and being of at least two thicknesses of material throughout its length, a first coin cup extension carried by the outer thickness of said body portion at one end thereof and extending longitudinally beyond such end, a partition secured to one longitudinal edge of the body portion and adapted to be arranged in superposed relation with the body portion and having pockets, a second coin cup extension secured to one end of the partition and adapted to register with the first coin cup extension and secured thereto for forming therewith a coin cup having a wall of double thickness, said wall being common to said partition and body portion and maintaining the partition and body portion in superposed relation, said partition extending longitudinally of the body portion for approximately one-half of its length, and an extension carried by the end of the partition remote from the coin cup and extending longitudinally of the body portion for the major portion of its length beyond the partition and having a pocket and being foldable with the adjacent part of the body portion upon the partition when the bill folder is closed.

12. A bill folder comprising a body portion including first and second sides between which bills may be placed, means forming a coin pocket upon the bill folder which opens at one end of the bill folder, first and second registering coin cup extensions secured respectively to said first and second sides of the bill folder at the end of the bill folder adjacent the opening of the coin pocket, and means for securing said coin cup extensions together in registering relation to form a coin cup, whereby the coin cup will have a side of double thickness and the coin cup will serve to join said first and second sides of the bill folder.

13. A bill folder comprising a foldable blank including an elongated body portion side and a foldable partition portion joined to the body portion side, a separate elongated body portion side to be mounted upon the body portion side of the blank in superposed relation thereto, a line of welding securing the superposed body portion sides together adjacent their outer longitudinal edges and throughout substantially their entire lengths, a first coin cup extension carried by one end of the body portion side of said blank, a second coin cup extension carried by the corresponding end of the foldable partition portion and adapted to register with the first extension, and lines of welding securing the registering coin cup extensions together in assembly, whereby the extensions serve to join the folded partition portion to the body portion of the bill folder in superposed relation.

14. A bill folder comprising a foldable blank, said blank including an elongated body portion side, a generally L-shaped partition portion secured to one longitudinal edge of the body portion side and being foldable and adapted when folded to overlie the body portion side, first and second coin cup extensions secured to corresponding ends of the body portion side and partition portion and adapted to register when the folded partition portion is overlying said body portion side, a pair of foldable pocket forming sides connected with said foldable partition portion of the blank and forming upon the folded partition a pocket arranged opposite one end portion of the body portion of the bill folder, and a separate elongated body portion side adapted to be mounted upon the body portion side of the blank and secured thereto adjacent corresponding longitudinal edges of the body portion sides.

15. A bill folder comprising blank means, said blank means having a body portion including sides and a partition portion including sides, a pocket forming side secured to said body portion and free from connection with the partition portion, coin cup forming extension means carried by the blank means, and means for securing selected body portion sides to each other and to the pocket forming side and selected partition portion sides to each other in the completed bill folder.

16. A bill folder comprising blank means, said blank means including a body portion having sides and a partition portion having sides, a pocket forming side secured to the body portion and free from connection with the partition portion, and a pair of coin cup forming extensions secured to one end of the blank means, whereby selected body portion sides are first superposed upon each other and the pocket forming side is superposed upon selected body portion sides and the partition portion sides are then superposed upon each other and the partition portion is then superposed upon the body portion in the completed bill folder.

17. A bill folder comprising blank means, said blank means including a body portion foldable longitudinally and transversely, a partition portion secured to one longitudinal edge of the body portion and foldable longitudinally and transversely and then foldable as a unit upon the folded body portion, a pair of coin cup forming extensions secured to corresponding ends of the body portion and partition portion and adapted to be arranged in superposed registering relation, and means for securing selected sections of the body portion together and selected sections of the partition portion together and for also securing said coin cup forming extensions of the body portion and partition portion together in the completed bill folder.

18. A bill folder comprising a blank of flexible sheet material, said blank including a substantially rectangular foldable body portion having sides, a pocket forming side secured to one edge of one body portion side and foldable upon selected body portion sides when the body portion is folded, a generally L-shaped partition portion having sides secured to one body portion side and being foldable, a first coin cup extension carried by one end of one partition portion side and projecting beyond the corresponding end of said body portion, a substantially rectangular lining side secured to one longitudinal edge of said partition portion and foldable upon the side of the partition portion carrying the first coin cup extension, and a second coin cup extension secured to one end of the lining side and adapted for superposed registering relation with said first extension when the lining side is superposed upon the partition portion side having the first coin cup extension.

19. A bill folder comprising a unitary flexible blank of sheet material, said blank including a generally rectangular foldable body portion having sides, a pocket forming side secured to one longitudinal edge of one body portion side and foldable upon one pair of body portion sides when the body portion is longitudinally folded, a generally L-shaped foldable partition portion having sides and secured to one longitudinal edge of another of said body portion sides and spaced from said pocket forming side and free from direct attachment thereto, a first coin cup extension secured to one end of one partition portion side and projecting longitudinally beyond the corresponding end of the body portion, and a second coin cup extension secured to said corresponding end of the body portion side which carries the partition portion, whereby the body portion may first be folded transversely and the partition portion sides are folded upon each other and then folded as a unit upon the pair of body portion sides remote from the pocket forming side, the first and second coin cup extensions then registering, and means securing the first and second coin cup extensions together and also serving to maintain the folded partition portion upon said pair of body portion sides.

20. A bill folder comprising an elongated body portion including pocket forming means and being of at least two thicknesses of material throughout its length, a first coin cup extension carried by the outer thickness of said body portion at one end thereof and extending longitudinally beyond such end, a partition secured to one longitudinal edge of the body portion and adapted to be arranged in superposed relation with the body portion and having pockets, a second coin cup extension secured to one end of the partition and adapted to register with the first coin cup extension and secured thereto for forming therewith a coin cup having a wall of double thickness, said wall being common to said partition and body portion and maintaining the partition and body portion in superposed relation, said partition extending longitudinally of the body portion for approximately one-half of its length.

References Cited in the file of this patent

UNITED STATES PATENTS

| 2,358,008 | Herbener | Sept. 12, 1944 |
| 2,453,032 | Campbell | Jan. 27, 1948 |